(12) United States Patent
Schloesser

(10) Patent No.: US 7,083,039 B2
(45) Date of Patent: Aug. 1, 2006

(54) CONVEYOR CLEANING APPARATUS

(75) Inventor: Christopher M. Schloesser, Hudson, WI (US)

(73) Assignee: Oxbo International Corporation, Byron, NY (US)

( * ) Notice: Subject to any disclaimer, the term of this patent is extended or adjusted under 35 U.S.C. 154(b) by 0 days.

(21) Appl. No.: 10/658,829

(22) Filed: Sep. 8, 2003

(65) Prior Publication Data

US 2005/0061623 A1    Mar. 24, 2005

(51) Int. Cl.
*B65G 45/18* (2006.01)

(52) U.S. Cl. ...................... 198/496; 198/494
(58) Field of Classification Search ............... 198/493, 198/494, 495, 496, 497
See application file for complete search history.

(56) References Cited

U.S. PATENT DOCUMENTS

| | | | | |
|---|---|---|---|---|
| 3,815,728 A | * | 6/1974 | Vaughan | 198/495 |
| 5,117,967 A | * | 6/1992 | Morrow et al. | 198/495 |
| 5,118,353 A | * | 6/1992 | Tilby | 127/2 |
| 5,161,666 A | * | 11/1992 | Pope | 198/498 |
| 5,368,650 A | * | 11/1994 | Tanaka et al. | 134/15 |
| 5,372,243 A | * | 12/1994 | King | 198/495 |
| 5,421,448 A | * | 6/1995 | Falcioni | 198/498 |
| 5,613,594 A | * | 3/1997 | Kootsouradis | 198/495 |
| 5,758,761 A | * | 6/1998 | Selbertinger et al. | 198/495 |
| 6,051,076 A | * | 4/2000 | Oechsle et al. | 134/15 |
| 6,135,267 A | * | 10/2000 | Straub | 198/495 |
| 6,206,175 B1 | * | 3/2001 | Tschantz | 198/493 |
| 6,305,184 B1 | * | 10/2001 | Kuhl | 62/380 |
| 6,321,586 B1 | * | 11/2001 | Wojtowicz et al. | 73/9 |
| 6,364,959 B1 | * | 4/2002 | Straub et al. | 134/9 |
| 6,533,102 B1 | * | 3/2003 | Franzoni et al. | 198/495 |
| 6,644,463 B1 | * | 11/2003 | Mott | 198/496 |
| 6,651,803 B1 | * | 11/2003 | Virippil et al. | 198/495 |
| 6,666,395 B1 | * | 12/2003 | Cavalieri | 241/85 |

* cited by examiner

*Primary Examiner*—Douglas Hess
(74) *Attorney, Agent, or Firm*—Merchant & Gould P.C.

(57) ABSTRACT

A conveyor apparatus has a conveyor cleaner assembly proximate the delivery end. The cleaner assembly has first and second parallel rotating brushes having an axis of rotation substantially transverse to the conveyor direction of travel and rotating in the same direction as the conveyor. The first brush is nearer the conveyor and wherein the second brush is higher than the first brush. The cleaning assembly also includes a roller parallel to the first and second brushes and a bottom catch panel below the brushes sloping toward the conveyor. The brushes may be in contact with the conveyor, the bottom panel, the roller and each other.

17 Claims, 7 Drawing Sheets

CONVEYOR CLEANING APPARATUS

BACKGROUND OF THE INVENTION

1. Field of the Invention

The present invention is directed to an agricultural harvester, and in particular to a cleaning apparatus for an agricultural harvester conveyor.

2. Description of the Prior Art

Agricultural equipment for handling citrus fruit and other crops are well known and have reached a high degree of mechanization. As harvesting equipment becomes more and more advanced, in addition to removing crops from the growing plants, the mechanized harvesters and other handling equipment collect and move the crops along to trucks and other mass transport vehicles.

It can be appreciated that the utility of such transport systems is increased if material other than the desired crop is removed early in the collection and transport process. Removal of this debris such as twigs and leaves at an early stage has several advantages. By removing the debris, the wear on equipment is reduced, as the equipment is typically not designed for transporting leaves, twigs and other unwanted material. The cost of transporting this debris and the capacity is increased if the debris is removed prior to being transported by other equipment. In addition, automatic removal of the debris at an early stage reduces the equipment needed to clean the crop at a later stage in processing. In some cases, the cleaning may require manual inspection and the early automatic removal of leaves and other debris may reduce labor costs associated with inspecting and removal of unwanted materials at a processing plant.

Although blowers and other devices for removing leaves and other debris do improve the overall quality of the harvested crop, still further improvements are possible. Prior art cleaning systems have typically been complicated and expensive and may require major reconfiguration of the harvesting equipment to accommodate the cleaning equipment. Such cleaning systems also may be subject to jamming and struggle to separate and remove unwanted debris and yet allow continued transport of the harvested crop.

It can be seen then that a new and improved agricultural harvester and an automatic system for removing unwanted debris is needed. Such a system should efficiently remove unwanted debris while continuing transport of the harvested crop. Moreover, such a system should be easily adaptable to existing equipment and be efficient and reliable without jamming. The present invention addresses these, as well as others associated with mechanized agricultural harvesters and automatic cleaning systems.

SUMMARY OF THE INVENTION

The present invention is directed to a harvester apparatus, and in particular to a cleaning assembly for a conveyer, such as for a harvester. The harvester apparatus can include a shaker assembly as well as a conveyer assembly. The shaker assembly typically includes a mast and movable arms supporting whorl arrangements that are rotatably configured for engaging branches of citrus trees. The whorls move within the arms in a reciprocal motion and are arranged to extend horizontally from the mast to move the whorl arrangements in and out of the branches of the tree, thereby shaking the branches.

A conveyer assembly is extendably mounted on the harvester and moves in and out in response to a sensor assembly to properly maintain the conveyer relative to the tree for optimizing its position to catch fallen fruit. The conveyer extends and retracts depending upon input from the sensor assembly engaged in the trunk of the tree. The sensor assembly may include a sealing arrangement to further improve the percentage of fallen fruit caught by the harvester. A rearward directed conveyer transports the cleaned fruit rearward to another vehicle for further transport.

The cleaning assembly includes a pair of longitudinally extending rotating bristle-type brushes mounted in parallel. The inner brush is approximate the upper edge of the conveyer, while the outer brush is mounted upward and outward from the inner brush. The cleaning assembly further includes a cleaning bar engaging the lower outer side of the bristles of the outer brush. A cleaning assembly bottom catch panel extends downward from the cleaning bar below the two brushes towards the rearward traveling bottom conveyer. Each of the brushes includes bristles mounted over the entire exterior area of the axle. The brushes are sized and have enough flexibility so that fruit can fall through the bristles as the brushes rotate. The brushes are configured to rotate in the same direction towards the edge of the harvester away from the conveyer. The density of the harvested fruit causes the fruit to fall through the rotating brushes while leaves, twigs and other debris is typically lighter and is propelled over the cleaning bar and side of the harvester. This provides for efficient separation of unwanted debris from the harvested fruit and the separated debris is allowed to fall to the ground. The brushes are typically mounted and sized so that the bristles overlap between the rotational axes of the brushes as well as engaging the upper end of the conveyer, and the cleaning bar. It has been found that the present invention achieves a surprising degree of cleaning with virtually no fruit propelled from the harvester while removing a very high percentage of unwanted debris. The cleaning assembly reduces inspection and further cleaning later in the transport and processing of the harvested crop.

These features of novelty and various other advantages that characterize the invention are pointed out with particularity in the claims annexed hereto and forming a part hereof. However, for a better understanding of the invention, its advantages, and the objects obtained by its use, reference should be made to the drawings that form a further part hereof, and to the accompanying descriptive matter, in which there is illustrated and described a preferred embodiment of the invention.

BRIEF DESCRIPTION OF THE DRAWINGS

Referring now to the drawings wherein like reference numerals and letters designate corresponding structure throughout the several views.

DETAILED DESCRIPTION OF THE PREFERRED EMBODIMENT

Figure 1:
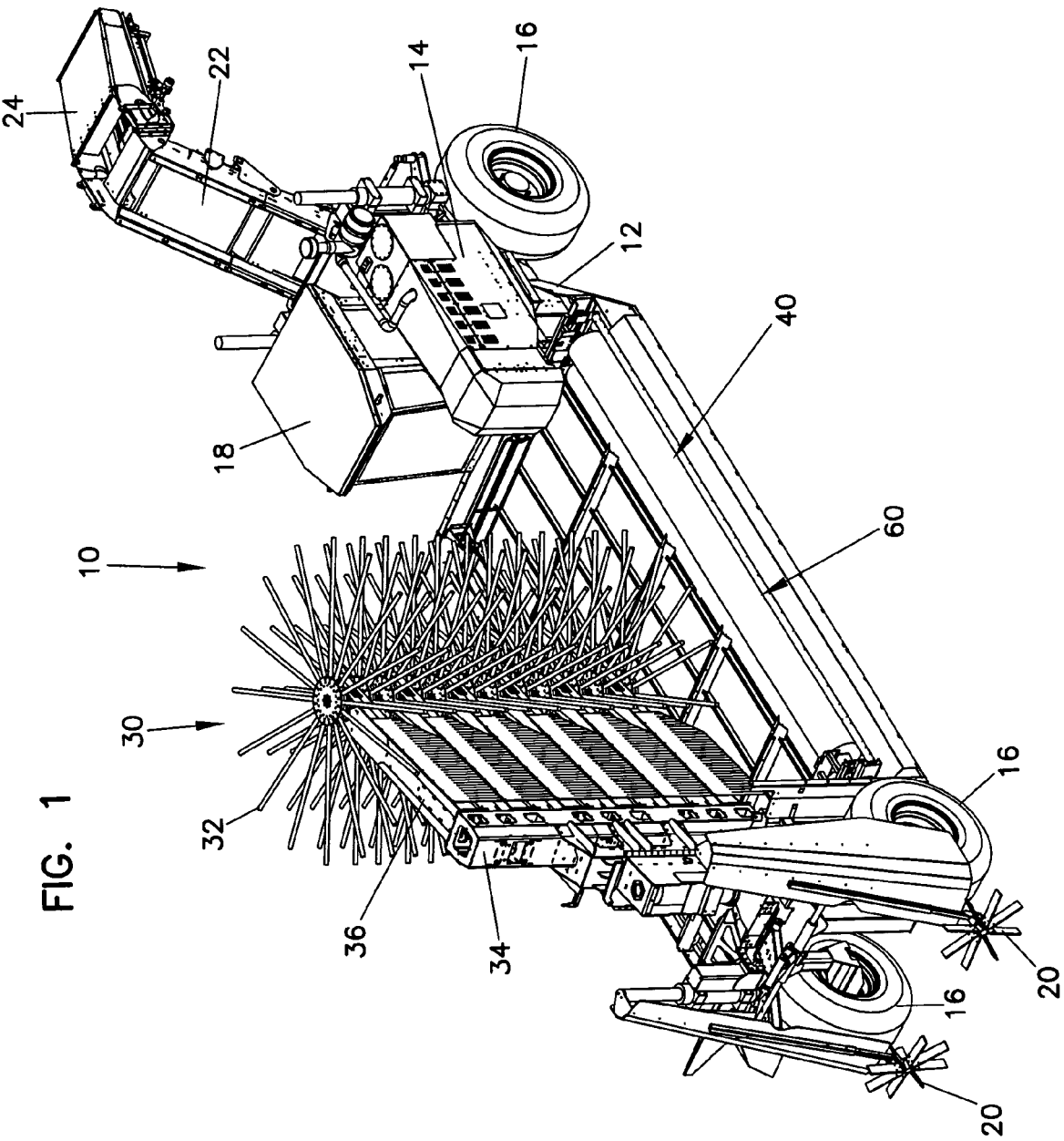
FIG. 1 is a perspective view of an agricultural harvester according to the principles of the present invention.
Figure 2:
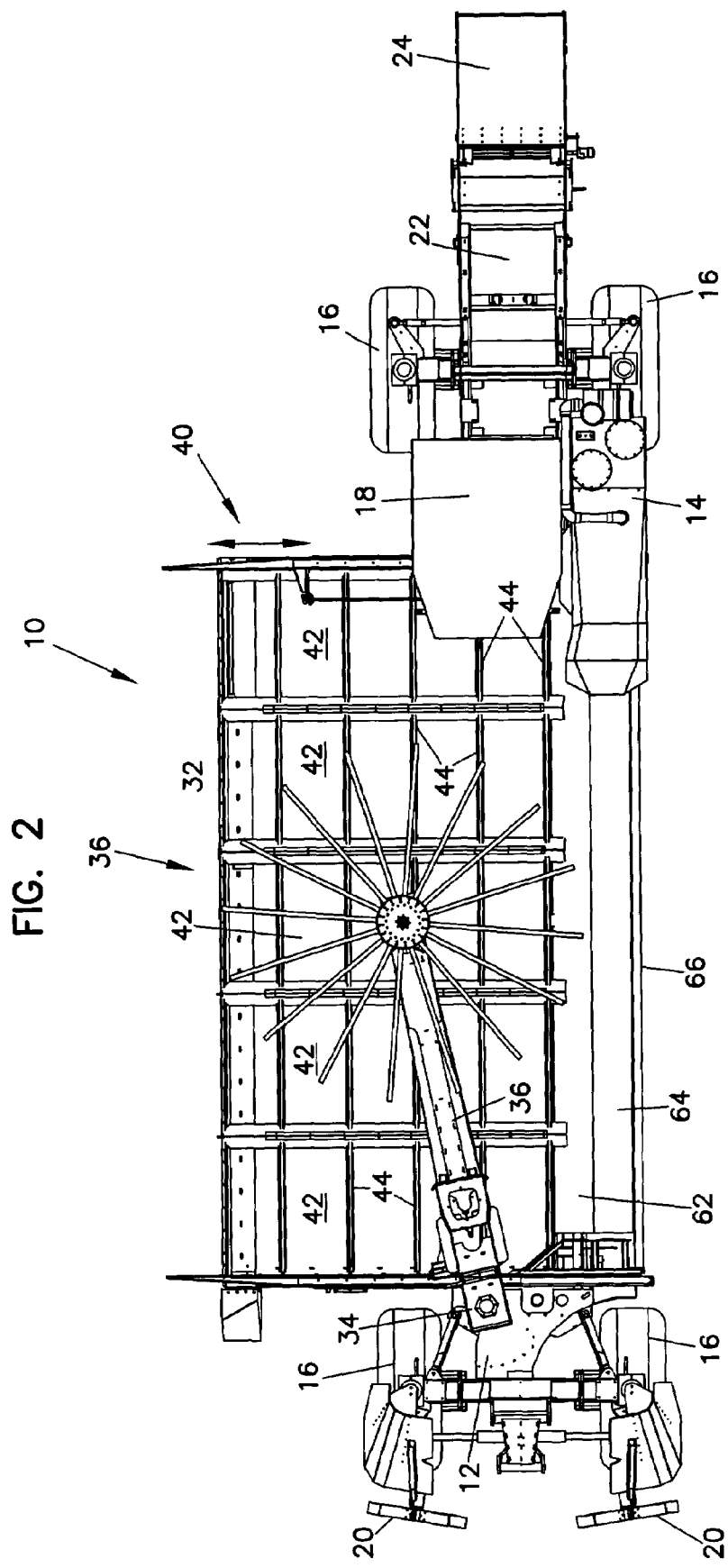
FIG. 2 is a top plan view of a the harvester shown in FIG. 1.
Figure 3:
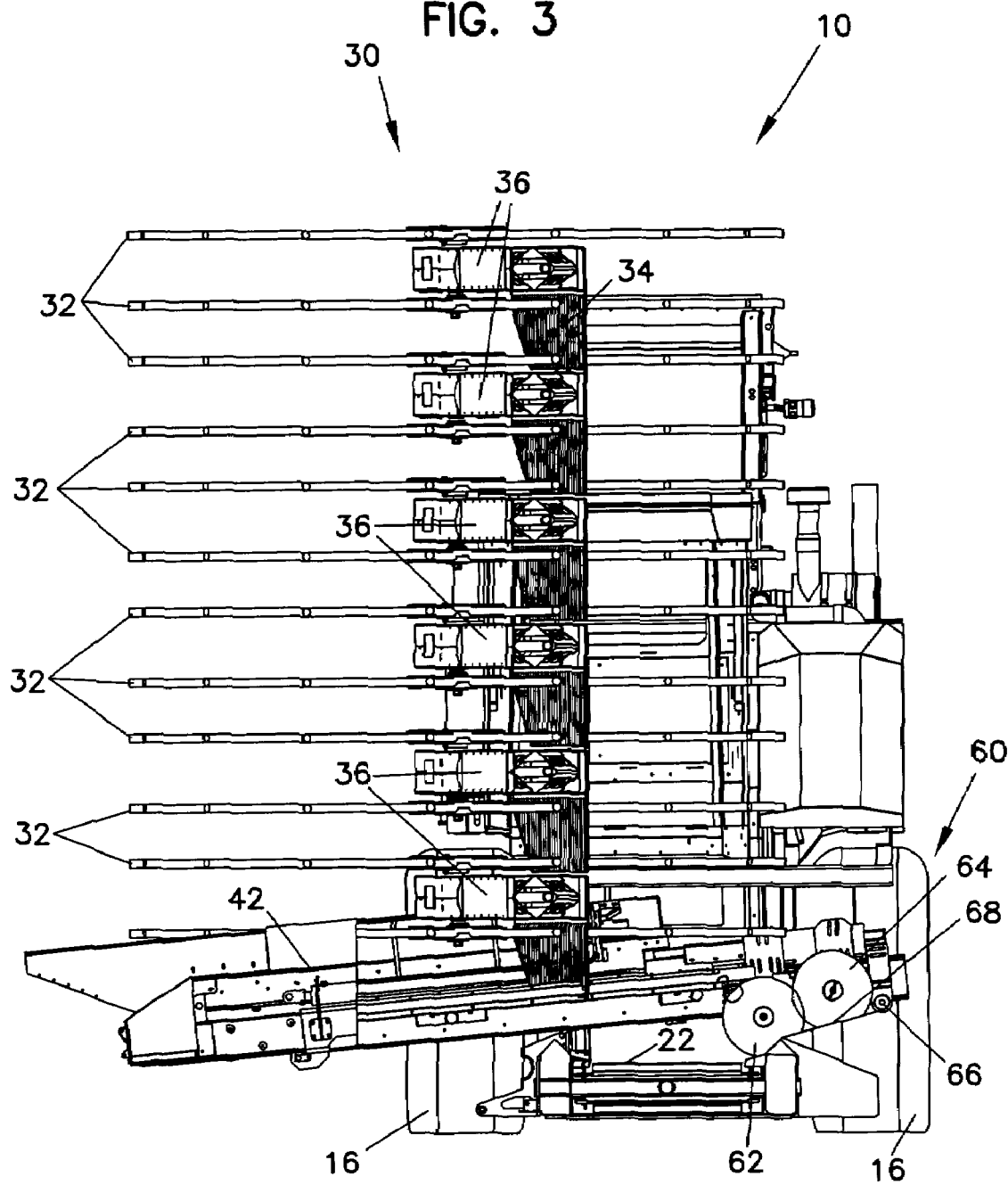
FIG. 3 is a sectional view of the harvester and the conveyor and cleaning brush assembly shown in FIG. 2.

Referring now to the drawings, and in particular to FIGS. 1–3, there is shown an agricultural harvester apparatus, generally designated 10. The harvester apparatus 10 shown in the drawings is particularly suited for removing citrus fruit from trees. However, it is contemplated that other equipment that requires separation of harvested crops from leaves, twigs and other debris is also within the scope the present invention.

The harvester 10 generally includes a frame 12, and wheels 16 powered by an engine 14. A cab 18 is generally placed at the rear of the harvester 10 so the operator can steer and observe the harvesting simultaneously while facing forward. The harvester 10 also includes a shaker assembly 30, configured for engaging trees, as explained hereinafter. A conveyer assembly 40 catches loosened fruit and transports it to a cleaner assembly 60. A longitudinal belt conveyer 22 below the conveyor assembly 40 transports the harvested crop rearward to a delivery chute 24 that delivers the crops to a towed trailer or a transport truck or vehicle (not shown). The harvester 10 may also include brush-type cleaners 20 to help clear a path on the ground and to decrease the amount of fallen fruit that is run over by the wheels 16 of the harvester 10. The conveyer assembly 40 is movable laterally to provide proper positioning relative to the plants, such as citrus trees, for maximizing the harvest yield. In addition, the harvester may include a trunk seal device (not shown for clarity) such as disclosed in U.S. Pat. No. 6,463,725 to Briesemeister, incorporated herein by reference. The seal assembly generally includes sensors to move the conveyer 40 in and out as well as providing pivoting sealing members that engage the trunk of the tree and are angled to deliver fruit falling onto the sealing members to the conveyer 40. Other types of seal arrangements are also well known in the art may also be utilized with the present invention.

The shaker assembly 30 includes a mast 34 supporting a number of moveable arms 36 that extend horizontally in a stacked configuration. At the ends each of the arms 36 are mounted whorl arrangements 32 having beater rods extending radially outward. The rods of the whorl arrangements 32 engage the trees as the harvester 10 passes. In use, the harvester 10 is used in pairs with a complimentary harvester so that two harvesters engage each tree at the same time, one engaging the tree from opposite sides. In this manner, the tree is shaken with two shaker assemblies 30 and the conveyers 40 and sealing arrangements are in close proximity to provide substantial coverage with little or no exposed ground so that very little fruit is not collected. The arms 36 move the whorl arrangements 32 in a linear reciprocating motion to engage and shake the tree branches. The whorl arrangements 32 are also rotatably mounted to freely turn as the harvester 10 passes the tree and the whorl arrangements 32 engage the branches. It can be appreciated that the arms 36 generally extend to the side and rearward and are substantially above the conveyor assembly 40, as most clearly shown in FIG. 2. In this manner, the harvester 10 is properly positioned to both engage the branches and shake the fruit free as well as to recover and harvest the loosened fruit. It can further be appreciated that other shaker assemblies that are well known in the art may also be utilized with harvesters falling within the scope of the present invention.

Figure 5:
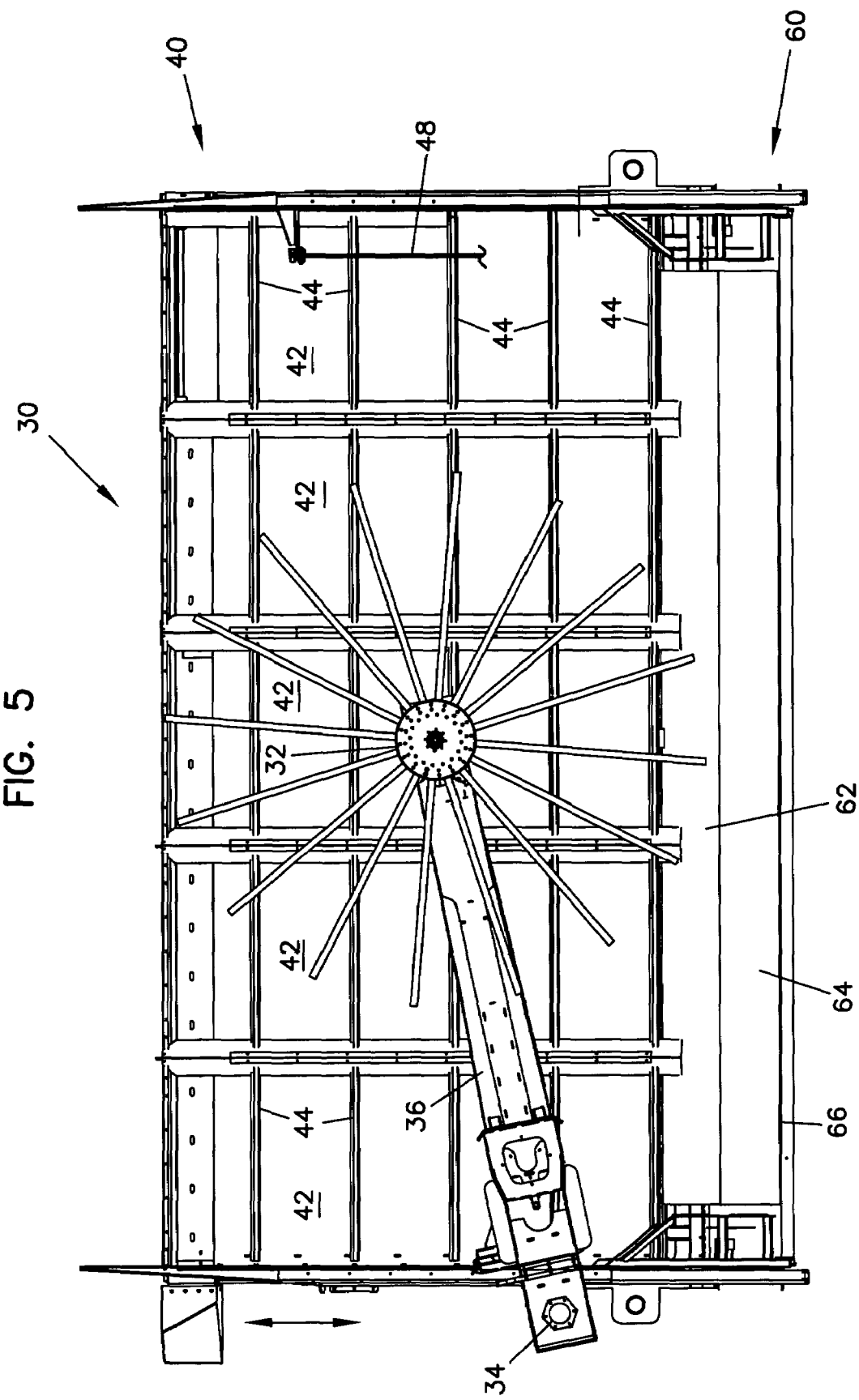
FIG. 5 is a top plan detail view of the cleaning brush assembly shown in FIG. 4 separating harvested crop from unwanted matter.
Figure 6:
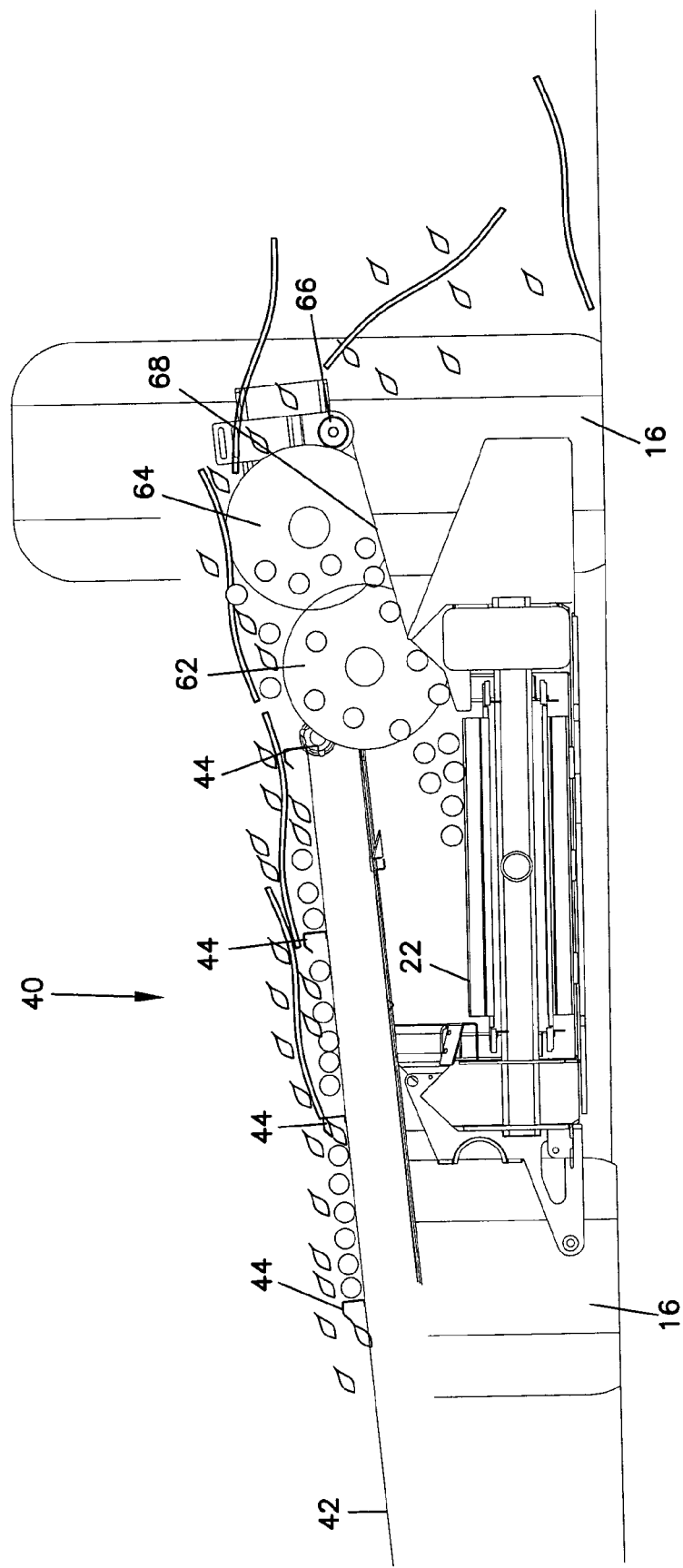
FIG. 6 is an end detail view of the cleaning brush assembly shown in FIG. 4 separating harvested crop from unwanted matter.

Referring now to FIGS. 5 and 6, the conveyer assembly 40 generally includes a series of chains 42 generally moving across the deck from the right side of the harvester 10 to the left side in the embodiment shown. The conveyer assembly 40 is moveably mounted and may be extended and retracted in response to a sensor assembly (not shown) to move the conveyer 40 in and out for catching the fallen fruit. The conveyer chains 42 also include cleats 44 spaced apart and mounted on the chains 42 extending transverse to the direction of travel. The cleats 44 sweep upward and across the deck of the conveyor 40 ensure that fruit does not slide down the slope of the conveyer 40 and is transported upward, as shown in FIG. 6. A rotary skirt shaker 48 shown in FIG. 5 engages and removes fruit on the low hanging branches of citrus trees. It can be appreciated that the conveyer 40 is at a slight angle to carry fruit upward and use gravity to aid in separation from leaves, twigs and other unwanted debris, as explained hereinafter.

Following cleaning, as explained below, when the fruit has fallen from the conveyer 40 as shown in FIG. 6, it falls onto the longitudinal conveyer 22. The longitudinal conveyer 22 transports the fruit rearward and then upward, as shown in FIG. 1, where it transports fruit to a delivery chute 24 where the fruit drops into a transport vehicle such as a truck or trailer. Specially designed transport vehicles are sometimes utilized that include a forward mounted bin that can closely follow the harvester 10 with the bin below the rear chute 24. In addition, the harvester 10 may include a hold so that the fruit may be held and transported on the harvester 10 and periodically expelled into a transport vehicle.

Figure 4:
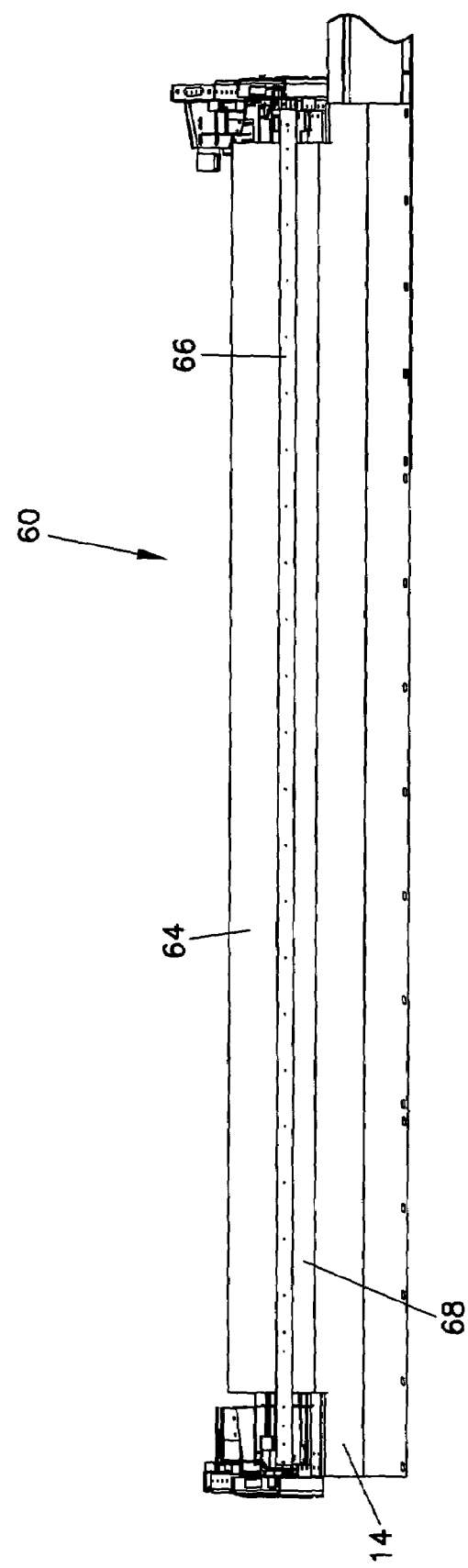
FIG. 4 is a side elevational view of the cleaning brush assembly for the harvester shown in FIG. 1.

Referring now to FIGS. 4–6, the cleaner assembly 60 generally includes a pair of brushes, including an inner brush 62 and an outer brush 64. The brushes 62 and 64 are elongated and mounted on parallel axes to extend longitudinally along the upper end of the conveyer assembly 40. The brushes 62 and 64 are both driven to rotate toward the edge of the harvester 10, generally shown as rotating clockwise in FIG. 6. The brushes 62 and 64 include radially extending bristles spaced around the periphery of a center axle and spaced along the length of each of the brushes 62 and 64, substantially covering the exterior surface. The cleaner assembly 60 also includes a cleaner bar 66 generally mounted parallel to the inner and outer brushes 62 and 64. The cleaner bar 66 is typically mounted outward and below the center axis of the outer brush 64. The cleaner bar 66 and the brushes 62 and 64 are adjustably mounted so that the outer ends of the bristles of the brushes 62 and 64 may encounter more or less contact or resistance. A bottom panel 68, such as a sheet of canvas or other durable material, extends downward below the cleaner bar 66, the outer brush 68 and a portion of the inner brush 62. The bottom panel 68 is generally sloped downward so that fruit on the panel 68 rolls downward onto the longitudinal conveyer 22. The fruit is then transported rearward on the conveyer 22, as explained above.

Figure 8:
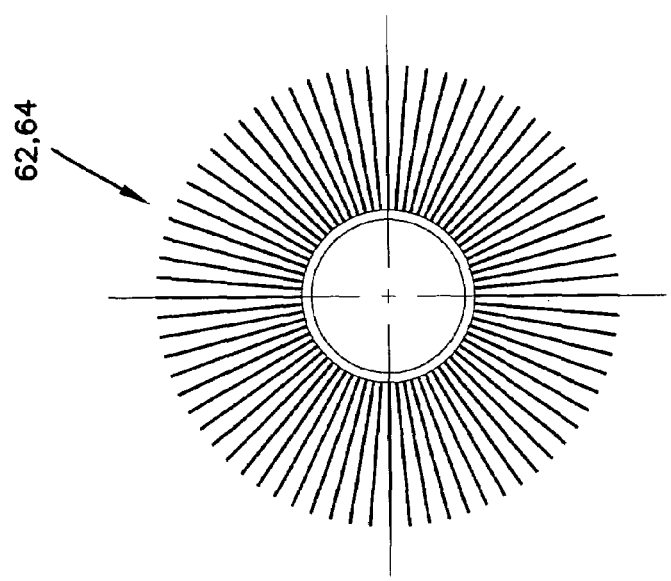
FIG. 8 is an end elevational view of the brush element shown in FIG. 7.
Figure 7:
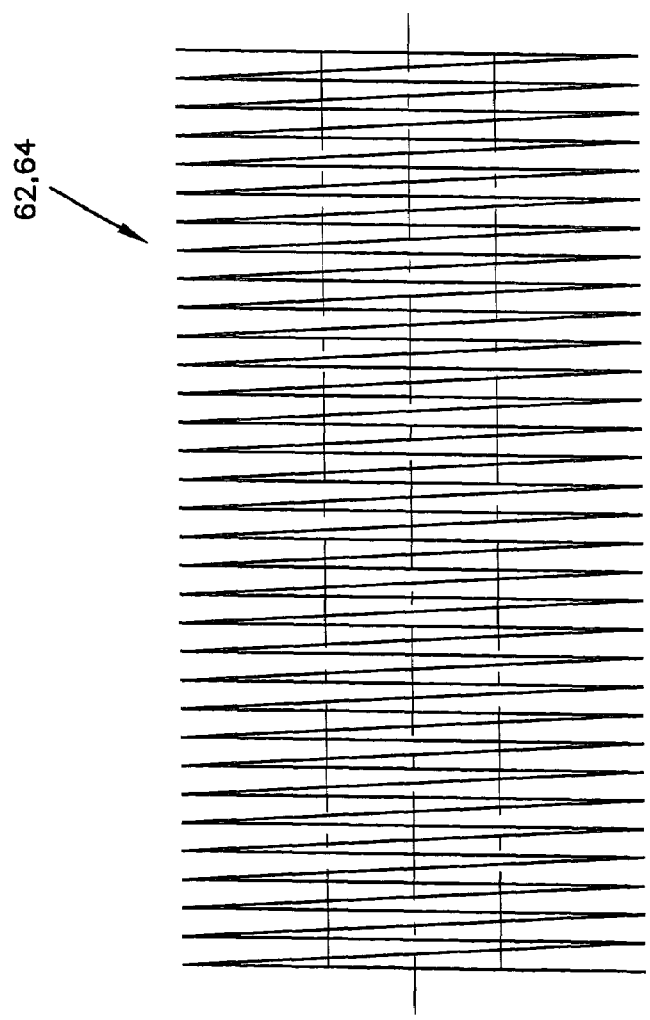
FIG. 7 is a side elevational view of a brush element for the brush assembly shown in FIG. 4.

In operation, fruit is shaken loose by the whorl arrangements 32 of the shaker assembly 30 engaging the tree and falls onto the conveyer assembly 40. The cleats 44 transport the fruit along with twigs, branches, leaves and other debris that has fallen along with the fruit up to the cleaner assembly 60. After falling off the upper end of the conveyer 40, the fruit and debris typically first engage the upper surface of the inner brush 62, as shown in FIG. 6. As the fruit is heavier and denser than the twigs and leaves, it is more likely to drop downward through the bristles of the brushes 62 and 64. The bristles of the brushes have a particular rigidity and are spaced and sized such that the fruit can fall through the bristles while the lighter debris tends to be propelled over the edge of the harvester, as shown in FIG. 6. The type, length and rigidity of the bristles and the rotational speed of the brushes 62 and 64 will vary according to the application. As shown in FIGS. 7 and 8, in a typical embodiment for harvesting oranges, which have a mean diameter of approximately 2½, the brushes 62, 64 have an outer diameter of 16 inches, an inner diameter of 4 inches and a length of 116 inches. In the embodiment shown, the brushes 62 and 64 use a helical bristle configuration with a pitch of 1.5 inches with bristles composed of nylon 6.6 material and a diameter of 0.028 inches.

The brushes 62 and 64 are also configured so that the bristles are forced to flex as the inner brush 62 typically engages the inner side of the conveyer 40 as well as the cleaner assembly bottom panel 68. The outer brush 64 also typically engages the cleaner assembly bottom support 68 and typically engages the cleaner bar 66. It can be appreciated that different harvesting conditions and fruit varieties may dictate adjustment of the mounting positions for the various components. The brushes 62 and 64 are typically mounted so that the bristles engage each other at a point between the axes of the brushes 62 and 64. As shown in FIG. 6, the bristles of the inner brush 62 are moving downward at the engagement point with the outer brush 64 where the bristles of the outer brush 64 are generally moving upward at the point of engagement. This rotational motion tends to prevent leaves and twigs from falling through the brushes while fruit falls through the bristles intermediate the rotational axes of the brushes 62 and 64. The size and rigidity of the bristles provides for their deflection to allow the fruit to fall downward through the brushes 62 and 64. The fruit may fall in several paths for cleaning. Some fruit falls between the conveyer 40 and the center axis of the inner brush 62. Other fruit falls between the brushes 62 and 64. When the fruit has fallen through the brushes 62 and 64, both brushes are rotating to move the fruit along the upper surface of the cleaner assembly bottom panel 68 and downward onto the longitudinal conveyer 22. The rotational direction of the brushes 62 and 64 also tends to propel the lighter leaves and twigs upward and over the side of the cleaner bar 66 and the harvester 10.

With the arrangement of the cleaner assembly 60 according to the principles of the present invention, virtually no fruit is propelled over the edge of the harvester 10 and lost. Moreover, extremely high efficiencies are obtained from removing leaves, twigs and other unwanted debris so that the fruit leaving the delivery chute 24 is clean and requires virtually no additional cleaning at the factory. The cleaner assembly 60 is also simple and reliable and while achieving its high cleaning efficiency.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

The is claimed is:

1. A conveyor apparatus, comprising:
    a conveyor transporting articles having a direction of travel from a receiving end to a delivery end:
    a separator assembly proximate the delivery end for removing debris from the transported articles, wherein the separator assembly comprises first and second rotating brushes having an axis of rotation substantially transverse to the conveyor direction of travel;
    wherein the first brush is in contact with the conveyor and the second brush is spaced apart from the conveyor.
2. A conveyor apparatus according to claim 1, wherein the brushes travel in the same direction as the conveyor.
3. A conveyor apparatus according to claim 1, wherein the conveyor comprises a plurality of spaced apart cleats transverse to the direction of travel.
4. A conveyor apparatus according to claim 1, wherein the brushes are parallel.
5. A conveyor apparatus according to claim 1, wherein the first brush is nearer the conveyor than the second brush.
6. A conveyor apparatus according to claim 1, further comprising a catch panel below the brushes sloping toward the conveyor.
7. A conveyor apparatus according to claim 6, wherein at least one of the brushes is in contact with the catch panel.
8. A conveyor apparatus according to claim 6, wherein the brushes are in contact with one another.
9. A conveyor apparatus according to claim 1, wherein the first brush is in contact with the conveyor and the second brush is spaced apart from the conveyor.
10. A conveyor apparatus, comprising:
    a conveyor transporting articles having a direction of travel from a receiving end to a delivery end;
    a separator assembly proximate the delivery end for removing debris from the transported articles, wherein the separator assembly comprises first and second rotating brushes having an axis of rotation substantially transverse to the conveyor direction of travel, wherein the first brush is nearer the conveyor; and
    a first element extending parallel to and along the first and second brushes below and further from the conveyor than the second brush.
11. A conveyor apparatus, comprising:
    a conveyor transporting articles having a direction of travel from a receiving end to a delivery end;
    a separator assembly proximate the delivery end for removing debris from the transported articles, wherein the separator assembly comprises first and second rotating brushes, the first brush having a first axis of rotation substantially transverse to the conveyor direction of travel and positioned beyond the delivery end, and the second brush having a second axis of rotation parallel to and spaced apart in the direction of travel from the first axis of rotation and positioned beyond the delivery end.
12. A conveyor apparatus, comprising:
    a conveyor transporting articles having an upper delivery run and a lower return run and a direction of travel along the upper run from a receiving end to a delivery end;
    a separator assembly proximate the delivery end for removing debris from the transported articles, wherein the separator assembly comprises parallel first and second rotating brushes having first and second axes of rotation substantially transverse to the conveyor direction of travel and positioned beyond the delivery end;

wherein only one of the brushes contacts the conveyor prior to the lower return run.

13. A conveyor apparatus according to claim 12, wherein the second brush is spaced apart from the conveyor.

14. A conveyor apparatus, comprising:
- a conveyor transporting articles having a direction of travel from a receiving end to a delivery end;
- a separator assembly proximate the delivery end for removing debris from the transported articles, the separator assembly comprising:
- a first rotating brush and a second rotating brush spaced apart from the first rotating brush and parallel to the first rotating brush, wherein the transported articles fall onto the separator assembly and pass downward intermediate the first and second rotating brushes, and wherein the debris falls onto the separator assembly and passes over the rotating brushes and is separated from the transported articles.

15. A conveyor apparatus according to claim 14, wherein the transported articles are heavier than the debris.

16. A conveyor apparatus according to claim 14, wherein the transported articles are denser than the debris.

17. A conveyor apparatus according to claim 14, wherein the brushes comprise bristles having a size and rigidity to support the debris.

* * * * *